Figure 1:
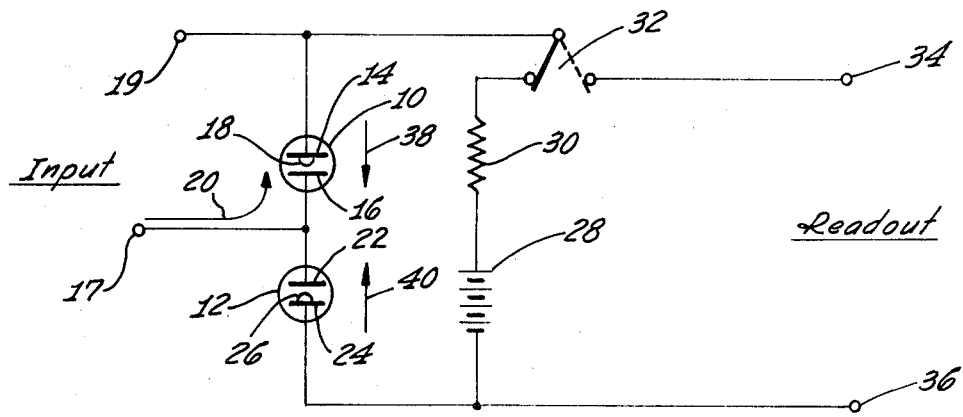

United States Patent

[11] 3,634,834

[72] Inventor Thomas B. Bissett
Malibu, Calif.
[21] Appl. No. 795,971
[22] Filed Feb. 3, 1969
[45] Patented Jan. 11, 1972
[73] Assignee The Bissett-Berman Corporation
Santa Monica, Calif.

[54] NONDESTRUCTIVE READOUT FOR ELECTROCHEMICAL STORAGE CELL
9 Claims, 2 Drawing Figs.
[52] U.S. Cl. ............................................. 340/173 CH, 324/94
[51] Int. Cl. ....................................... G11c 27/00, G11c 11/00, G11c 7/00
[50] Field of Search ........................................ 340/173 R, 173 CH; 324/94; 317/230–232; 204/5, 194

[56] References Cited
UNITED STATES PATENTS
3,172,083  3/1965  Constantine ............... 340/173
3,387,288  6/1968  Bissett et al. ............... 340/173
3,432,814  3/1969  Bissett ........................ 340/173
3,521,045  7/1970  Murphy ....................... 340/173 R Primary Examiner—Bernard Konick
Assistant Examiner—Stuart Hecker
Attorney—Smyth, Roston & Pavitt ABSTRACT: This invention is directed to a nondestructive readout system for an electrochemical storage cell using a second electrochemical storage cell in series with the first electrochemical cell and with the readout provided by passing a first current through both the first and second electrochemical cells so as to remove any information stored in the first cell while at the same time storing the same quantity of information in the second cell and then using a low-voltage source to provide a second current to the first and second cells in a direction to restore the information in the first cell while removing the information stored in the second cell and with the low-voltage source normally connected across the first and second cells.

INVENTOR:
Thomas B. Bissett

ATTORNEYS

NONDESTRUCTIVE READOUT FOR ELECTROCHEMICAL STORAGE CELL

The present invention relates to the nondestructive readout of electrochemical storage cells. These electrochemical storage cells include at least a pair of electrodes in contact with an electrolyte and the electrochemical storage cells also include an active material which is physically transferred between the electrodes in the cell. This physical transfer of active material may be used to provide for a storage of information. As a specific example, electrochemical cells of the type shown in copending application Ser. No. 519,634 now U.S. Pat. No. 3,423,648 filed on Jan. 10, 1966, in the name of Martin Mintz and assigned to the same assignee as the instant application may be used.

The electrochemical storage cells disclosed in the above-mentioned copending application are often included in monitoring systems to provide for the storage of information by the transfer of active material within the cells. It is often desirable to provide for a nondestructive readout of the information stored in the electrochemical storage cell, either in situ within the monitoring system or by removing the cell and reading out the information stored in the cell using a readout unit. The present invention provides for the reading out of the information stored in the cell in a nondestructive way so that the information may be replaced in the cell.

The present invention accomplishes the nondestructive readout by using a second electrochemical storage cell similar to the first cell. The first and second electrochemical cells are connected in series with each other. Information is stored in the first cell by applying an information signal to the first cell only and with the information signal in a direction to provide for the desired transfer of the active material between the electrodes in the first cell. When it is desired to readout the information now stored in the first cell, a second current is applied through both the first and second electrochemical cells in a direction to remove the active material which had been previously transferred by the information signal and to store a like amount of active material in the second electrochemical storage element.

Therefore, even though the first electrochemical storage element has had all of the active material retransferred during the readout, the information is not lost since this information is stored by a transfer of active material in the second electrochemical storage cell. The readout current which is used to provide for the readout of the information stored on the first cell may be provided within the monitoring system or by any external type of readout device, for example, a readout device such as shown in U.S. Pat. No. 3,387,288 issued on June 4, 1968, or patent application Ser. No. 711,311, now U.S. Pat No. 3,518,501 filed on Mar. 7, 1968, in the name of Thomas B. Bissett and John Brain Murphy, both patent and patent application being assigned to the same assignee as the instant application. The actual readout of all the information stored in the first cell may be determined when the voltage across the first cell rises and this rise in voltage occurs because the resistance across the cell rises when all of the active material is removed from one of the electrodes in the cell.

The present application provides for a unique method of retransferring the information back to the first electrochemical cell while removing the information which has been stored in the second electrochemical cell. The information is transferred back using a third flow of current through the first and second electrochemical cells in a direction opposite to the second flow of current and with the current being provided by a low-voltage source normally coupled across both the first and second electrochemical cells. Once the low-voltage source provides for the transfer of all of the active material stored in the second cell and provides for a transfer of active material in the first cell so as to reconstitute the information which was initially stored by the information signal, the low-voltage source ceases to provide for any significant flow of current through the first and second electrochemical cells.

This reduction of the third current flow to a negligible value occurs when all of the active material is transferred from one of the electrodes in the second electrochemical cell, and the resistance of the second cell therefore rises significantly. The rise in resistance decreases the current flow in the circuit provided by the voltage source and the first and second electrochemical cells. Also, the source of low-voltage normally has a value which is less than the maximum open circuit voltage for the second electrochemical cell so that no damage can occur due to the rise in voltage.

In a general embodiment of the invention, the first and second electrochemical cells are connected in series and a switch is provided so as to either connect the source of low-voltage or a source of readout current to the first and second electrochemical cells. The switch is normally in a position to connect the source of low voltage so that the switch may be thrown to the position to provide a readout current and once the readout has occurred the switch may be returned to its normal position to allow the low-voltage source to replace the information in the first electrochemical storage cell and to remove the information stored in the second electrochemical cell.

In a specific example of a nondestructive readout circuit of the present invention, a computer which is designed to monitor drinking habits is disclosed, which computer may be similar to that shown in copending application Ser. No. 711,312, now U.S. Pat. No. 3,521,045 filed on Mar. 7, 1968, in the name of John Brain Murphy and assigned to the same assignee as the instant application.

Figure 2:
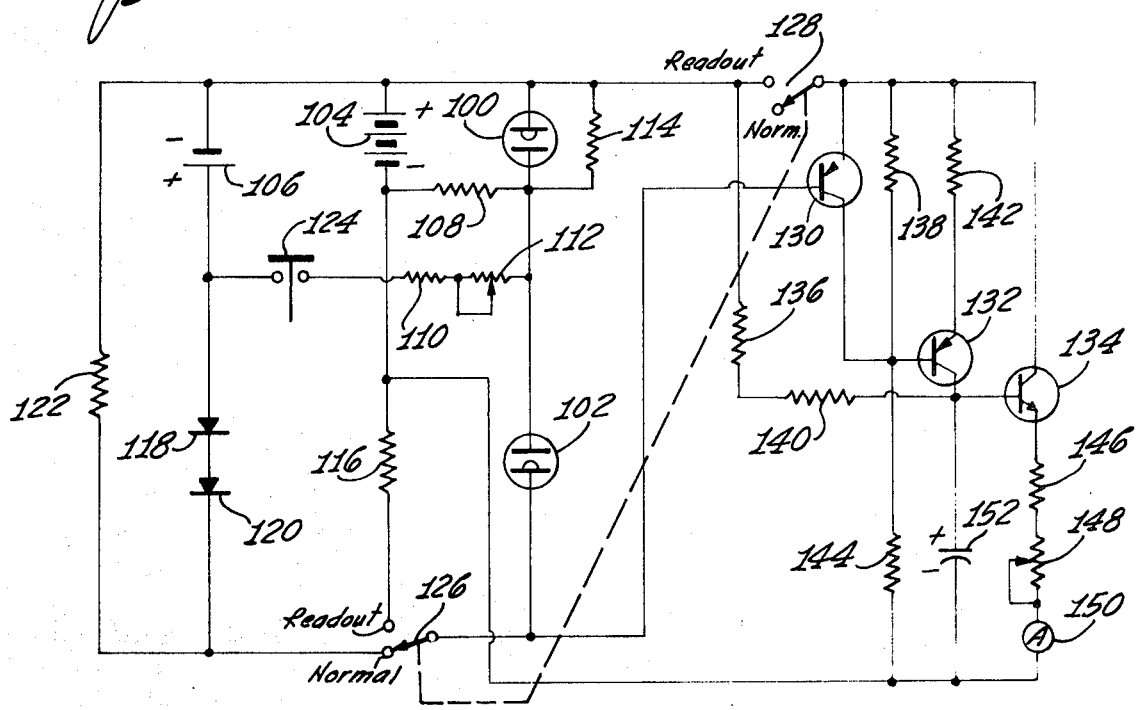

A clearer understanding of the invention may be had with reference to the following description and drawings wherein:

FIG. 1 illustrates a schematic of a nondestructive readout circuit constructed in accordance with the teachings of the present invention and which may be used to provide for the method of the present invention, and FIG. 2 illustrates a nondestructive readout circuit included in a monitoring system.

In FIG. 1, a nondestructive readout circuit is shown including a pair of electrolytic storage cells 10 and 12. The electrolytic storage cells may be of the type shown in copending application Ser. No. 519,634 filed Jan. 10, 1966, in the name of Martin Mintz. The electrochemical storage cell 10 is primarily used to store information and includes a pair of electrodes 14 and 16. The cell 10 also includes an active material 18 for transfer between the electrodes. As an example, the electrode 16 may be a storage electrode and, for example, the electrode 16 may be the outer container as shown in the copending application Ser. No. 519,634. The active material 18 is actually transferred between the electrodes through the use of an electrolyte which is in contact with the electrodes 14 and 16.

Input information is applied from a pair of terminals 17 and 19 through the electrochemical storage cell 10 in a direction as shown by the arrow 20. The input information, generally in the form of electrical current, passes through the electrochemical storage element 10 so as to transfer a quantity of active material 18 from the electrode 16 to the electrode 14. This transfer for active material is therefore in representation of the information and specifically the quantity of active material transferred depends upon the period of time the current 20 passes through the cell 10 and the amplitude of the current 20.

At times it is desirable to provide for a readout of this transfer of active material so as to determine the amount of information which has been stored. Many times it is desirable to readout the information in a nondestructive way so as to retain the information which has been stored in the cell 10.

The electrochemical storage cell 12 is useful in providing for this nondestructive readout. The cell 12 also includes a pair of electrodes 22 and 24 plus active material 26 for transfer between the electrodes in the same manner as discussed above with reference to the cell 10. Again, the electrode 22 may actually be a storage electrode such as a container electrode so as to provide a reservoir of active material 26. Also useful in the nondestructive readout of the present invention is a low-voltage source 28, a resistance 30 and a switch 32. The switch 32 is normally in the position shown by the solid line and is in the readout position when in the position shown by the dotted line.

Assuming that a particular quantity of information has been stored in the cell 10 and it is now desirable to provide for a readout, the switch 32 is moved to the dotted position and a readout current is applied to the series arrangement of cells 10 and 12 from output terminals 34 and 36. This readout current may be of any desirable type, for example, the readout may be provided in a manner disclosed in U.S. Pat. No. 3,387,288 or in copending patent application Ser. No. 711,311. The readout is accomplished when all of the active material 18 previously transferred to the electrode 14 by the information signal is retransferred back to the electrode 16. When all of the active material 18 is retransferred to the electrode 16, the resistance of the electrolytic cell 10 rises and this rise in voltage may be detected so as to disconnect the readout current. The direction of the readout current is as shown by the arrow 38.

It can be seen that as the active material 18 is retransferred back to the electrode 16, active material 26 is being transferred to the electrode 24. Initially the electrode 24 did not have any active material and the quantity of active material 26 which is transferred to the electrode 24 is determined exactly by the quantity of active material 18 which is retransferred back to the electrode 16. Therefore, while the readout current as represented by the arrow 38 is reading out the information stored in the cell 10, the same quantity of information as represented by the active material 26 is being stored in the cell 12.

After the readout is accomplished, the switch 32 may now be returned to its normal position as shown by the full line position of the switch. With the switch 32 in the normal position the low-voltage source 28 provides for a flow of current through the series arrangement of cells 10 and 12 in a direction as shown by the arrow 40. This current as represented by the arrow 40 operates to retransfer the active material 26 back to the electrode 22 while at the same time transferring active material 18 from the electrode 16 to the electrode 14. When all of the active material 26 is retransferred to the electrode 22, the same quantity of active material 18 is now present on the electrode 14 and reconstitutes the information stored in the cell 10.

When all of the active material 26 is retransferred from the electrode 24 to the electrode 22, the resistance of the cell 12 rises, thereby providing for an increase in voltage across the cell. Since the voltage source 28 has a relatively low voltage, for example, 0.2 volt, and since the rise in resistance of the circuit is greatly increased due to the rise in resistance of the cell 12, the current flow in the circuit due to the voltage source 28 is negligible. The value of the voltage source 28 is generally chosen to be within the maximum open circuit voltage that the cell 12 may be allowed to rise to when all of the active material is removed from one of the electrodes. Depending upon the particular design of the cell, the value of the voltage source 28 is chosen so as not to provide for an oxidation within the cell.

In FIG. 2, the nondestructive readout circuit of the present invention is incorporated in a monitoring circuit, for example a circuit for monitoring the level of alcohol in the blood of a drinker. The monitoring circuit may generally be of the type shown in copending application Ser. No. 711,312 filed in the name of John Brian Murphy and assigned to the same assignee as the instant application. The monitor of FIG. 2 includes first and second electrochemical cells 100 and 102, which cells have first and second electrodes and active material in the same manner as the cells 10 and 12 in FIG. 1. The cell 100 is used to store data while the cell 102 is used in the nondestructive readout process.

Included in the circuit of FIG. 2 are a pair of voltage sources 104 and 106. The voltage source 104 is generally of a higher value than the voltage source 106 and specifically the voltage source 104 may have a value of approximately 9 volts whereas the voltage source 106 may have a value of approximately 1.5 volts.

The embodiment of FIG. 2 also includes a plurality of resistors which are associated with the cells 100 and 102 so as to control the amplitude of the current through these cells. Specifically, resistors 108 and 110, variable resistor 112 and resistors 114 and 116 are associated with the cells 100 and 102 at various times to control the current through these cells. A pair of diodes 118 and 120 are used to drop the voltage produced by the source of voltage 106 so that at the appropriate time the voltage across the cells 100 and 102 is at a relatively low value, for example, equal to approximately 0.2 volt. A resistor 122 is coupled across this series circuit of voltage source 106 and the pair of diodes 118 and 120. Finally, a pair of switches 124 and 126 are used to control the direction of the flow of current through the cells 100 and 102.

A readout portion of the circuit is coupled to the cells 100 and 102 through a switch 128. The switch 128 and the switch 126 are ganged together and, as designated in FIG. 2, the switches 126 and 128 have "normal" positions and have "readout" positions. The switches 126 and 128 are normally maintained in the positions as shown in FIG. 2.

Coupled from the movable terminal of the switch 128 is the emitter of a transistor 130. A second transistor 132 is coupled from the collector of the transistor 130 and a third transistor 134 is coupled form the collector of the transistor 132. In addition, the readout circuit includes biasing resistors such as resistors 136, 138, 140, 142 and 144 plus load resistors 146 and 148 and an output meter 150. A capacitor 152 is coupled to the base of the transistor 134.

In a normal operation of the monitoring system of FIG. 2 there is initially no active material which has been transferred in representation of information in the cell 100 as well as in the cell 102. The rheostat 112 is adjusted so as to represent the weigh of the person whose blood alcohol is to be monitored. Other resistors may be included to control other factors and these particular matters are disclosed in copending application Ser. No. 711,312. In the particular embodiment shown in FIG. 2, the switch 124 plays a part in the weighting of the information which is to be stored in the cell 100. Specifically, the length of time that the switch 124 is held down determines the quantity of active material which is stored in the cell 100.

As an example, each 10 seconds that the switch 124 is held down may represent 1 ounce of standard 86-proof alcohol. It can be seen, therefore, that beverages such as wine, beer, brandy, rum, etc., would require that the switch 124 be held down for varying lengths of time in accordance with the proof of the alcoholic beverage consumed and the quantity of the beverage. As an example, a drink containing 2 ounces of 86-proof alcohol would require that the switch 124 be held down for 20 seconds. On the other hand, 2 ounces of brandy which has a proof approximately one-half of standard 86-proof alcohol would require that the switch 124 be held down for 10 seconds. The length of time, therefore, that the switch 124 is energized is a simple way of determining the particular quantity of information which is stored by the monitoring system of FIG. 2. The specific nature in which the monitor works in providing an approximation of the blood alcohol level may be seen with greater accuracy with reference to copending application Ser. No. 771,312.

When the switch 124 is depressed, the source of voltage 106 provides for a flow of current through the storage cell 100 in a direction to provide for the storage of active material in representation of the quantity of alcohol, the proof of the alcohol and the weight of the drinker. When the desired time for the switch 124 to be held down expires, the switch is released and the cell 100 now contains the proper storage of active material representing the quantity of alcohol which would be present in the blood if all of the alcohol is immediately absorbed into the bloodstream. The average person can assimilate alcohol in the bloodstream at a predetermined rate, and these details are all explained fuller in the copending application Ser. No. 711,312.

The source of voltage 104 provides a current flow through the cell 100 in a direction opposite to the current flow provided by the source of voltage 106. Also note that with the switch 126 in the position as shown in FIG. 2, the circuit including the source of voltage 104 and the cell 100 includes a resistor 108 and the resistor 108 is chosen to have a relatively high value so that the current flow through the cell 100 is relatively low and approximates the rate at which the body can assimilate the alcohol in the blood.

It can be seen, therefore, that each time the operator of the monitoring device of FIG. 2 takes a drink, he may depress the switch 124 for the appropriate length of time in representation of the proof and quantity of that drink and the cell 100 receives a transfer of a quantity of active material, which transfer is in a direction to represent an increase in the level of alcohol in the blood. The source of voltage 104 produces a counterflow of current through the cell 100 which represents a decrease in the level of alcohol in the blood. The counterflow of current, when extended for a long enough period of time, ultimately results in all of the active material being transferred back within the cell 100 so as to represent an assimilation of all of the alcohol in the blood.

During the operation of the monitoring device of FIG. 2, it is often desirable to produce an output indication to the user of the monitoring device as to the level of alcohol in the blood. This readout should be provided in a nondestructive way so that the operator of the device cannot erase the information stored in the cell 100. The readout may be accomplished by the use of the switches 126 and 128 which, as shown in FIG, 2, are ganged together. These switches are moved to the read position so as to provide for the nondestructive readout of the present invention.

When the switch 126 is in the read position, the voltage source 104 is now included in a circuit to produce a current flow through both the cells 100 and 102 and the resistor 116. The value of resistor 116 is chosen to be significantly less than the value of resistor 108 so that the voltage source 104 produces a current flow in a direction through the cell 100 so as to rapidly transfer all of the active material which has been stored in the cell in representation of information. At the same time the information is being removed from the cell 100, a comparable amount of information represented by a transfer of active material is stored in cell 102. When all of the information is removed from one of the electrodes in the cell 100, the resistance of the cell increases, thereby providing for a rise in voltage across the cell 100. Therefore, when the cell 100 has all of its active material removed from one electrode, the voltage at the base of the transistor 130 goes down to turn on the transistor 130.

Prior to the turning on of the transistor 130 and during the time that the cell 100 is being read out, the transistor 132 is turned on. The transistor 132 acts as a constant current source for the capacitor 152. The capacitor 152 normally has a voltage approximately equal to a value such as 0.6 volt because of the voltage applied to the capacitor 152 from the readout terminal of the switch 128 and through a voltage divider network of resistors 136 and 140. When transistor 132 turns on to act as the constant current source, the voltage across the capacitor 152 goes up in accordance with the length of time that the transistor 132 is turned on.

The transistor 134 is adjusted to be off when the value of the capacitor 152 is at or slightly below the normal voltage value across the capacitor 152, for example, the 0.6 volt. When the transistor 132 is turned on to supply current to build up the voltage across the capacitor 152, the transistor 134 is turned on as soon as the voltage across the capacitor exceeds the normal value of, for example 0.6 volt. When the transistor 134 is turned on, an output signal is now produced, which output signal passes through the meter 150. The meter may be, for example, an ammeter so that the meter 150 provides for an output indication in accordance with the current flow produced by the transistor 134. The transistor 134 is adjusted so that the output signal from the transistor 134 rises linearly in accordance with the rise in voltage across the capacitor 152.

Since the transistor 132 supplies a constant current to the capacitor 152, the voltage across the capacitor rises linearly. Therefore, as long as current flows through the cell 100 to provide for a readout of the cell 100, the meter 150 produces a rising output indication which represents the quantity of information which is stored in the cell 100. When all of the information is read out of the cell 100 as indicated above, the resistance of the cell 100 changes to provide an increase in voltage across the cell 100 which in turn provides for a decrease in the voltage at the base of the transistor 130. The decrease in voltage at the base of the transistor 130 turns on the transistor 130 which produces an output signal to turn off the transistor 132.

When the transistor 132 is turned off, the transistor 132 no longer acts as a constant current source for the capacitor 150 and the value of the voltage across the capacitor 150 is, therefore, maintained at its last value. The flow of current through the meter from the transistor 134 is at a constant value so as to provide for an indication of the quantity of information that had been stored in the cell 100 which in turn represents the level of the alcohol in the blood of the user of the monitoring device of FIG. 2.

The resistor 114 is used as a protective device since the cell 100, before all of the active material is transferred from one of the electrodes, has a relatively low resistance when compared with the resistor 114 and therefore almost all of the current produced by the voltage source 104 flows through the cell 100. However, when the cell 100 has all of the active material removed form one of its electrodes, the resistance rises and the resistor 114 is used to limit the current and voltage across the cell 100 to protect the cell 100.

When the meter 150 reaches a steady-state condition, the user of the device of FIG. 2, therefore, knows that the device has provided for the full readout and notes the level of the blood in the alcohol in accordance with the output indication from the meter 100. After the output indication on the meter is noted, the switches 126 and 128 may be activated back to their normal position as shown in FIG. 2. In the normal position of the switches shown in FIG. 2, the capacitor 152 is quickly discharged through transistor 134, resistors 146 and 148 and meter 150. The capacitor 152 drops to its normal level of approximately 0.6 volt, which level is not sufficient to maintain the transistor 134 on. The transistors 130 and 132 are also turned off since there is no supply voltage to these transistors through the switch 128.

The series arrangement of the cells 100 and 102 now receives a current from a source of low voltage 106 in combination with the diodes 118 and 120. This current from the source of low voltage 106 is in a direction to discharge the active material which had been stored during readout in the cell 102 and to recharge the cell 100 in accordance with the quantity of active material which is stored in the cell 102. The current flow from the source of low voltage 106 through the cells 100 and 102 continues until all of the active material which was stored during readout in the cell 102 is removed from one of the electrodes. At that time a comparable amount of active material had been restored in the cell 100 and this quantity of active material represents the active material which was stored in the cell 100 prior to the readout.

When all of the active material is removed from one electrode of the cell 102, the resistance across the cell 102 rises and this rise in resistance substantially limits the current through the cells 100 and 102 to a negligible value. The circuit after the complete readout cycle now continues to operate in the normal manner described above wherein information may be stored by depressing the switch 124 and then this information is removed at a constant rate in accordance with a current produced by the voltage source 104.

It is to be appreciated that the nondestructive readout circuit and the method using the circuit may be used in other systems in addition to the system shown in FIG. 2 and that the

I claim:

1. A nondestructive readout for the electrochemical cell storage unit, including,
a first electrochemical cell and a second electrochemical cell connected in series,
first terminal means for receiving a first current flow through the first electrochemical cell to store information in the first electrochemical cell,
second terminal means for receiving a second current flow through both the first and second electrochemical cells,
third switch means connected to the second terminal means and with the switch means having a first position to receive a readout current to read out the information stored in the first electrochemical cell and at the same time to store the same quantity of information in the second electrochemical cell and with the switch means having a second position to receive a restoring current to remove the information stored in the second electrochemical cell and to restore the information originally stored in the first electrochemical cell, and
fourth voltage source means having a value less than 0.5 volts coupled to the third switch means in the second position to provide the restoring current and with the third switch means normally in the second position.

2. A nondestructive readout for an electrochemical cell storage unit, including
a first electrochemical cell storage unit including at least first and second electrodes and including active material for transfer between the first and second electrodes and with the first electrochemical cell having a first impedance value with active material on both the first and second electrodes and with the first electrochemical cell having a second higher impedance value with active material only on the first electrode,
a second electrochemical cell storage unit including at least first and second electrodes and including active material for transfer between the first and second electrodes and with the second electrochemical cell having a first impedance value with active material on both the first and second electrodes and with the second electrochemical cell having a second higher impedance value with active material only on the first electrode,
first means coupled to the first electrochemical cell for providing a first current flow through the first electrochemical cell in a first direction to store information by transferring active material from the first to the second electrode,
second means coupled to the first and second electrochemical cells for providing a second current flow through the first and second electrochemical cells in a second direction to read out the information stored in the first electrochemical cell by retransferring all of the active material stored on the second electrode to the first electrode and at the same time transferring active material in the second electrochemical cell from the first to the second electrochemical cell,
third means coupled to the first and second electrochemical cells for providing a third current flow through the first and second electrochemical cells and with the third current flow in the same direction as the first current flow through the first electrochemical cell to transfer information from the first to the second electrode and with the third current flow in a direction through the second electrochemical cell to transfer all of the active material stored on the second electrode to the first electrode and with the third means including a source of voltage having a value less than 0.5 volts and with voltage across the second electrochemical cell rising to approximately the value of the source of voltage when all of the active material stored on the second electrode of the second electrochemical cell is transferred to the first electrode and with the third current flow substantially eliminated when the voltage rises across the second electrochemical cell.

3. The nondestructive readout of claim 2 wherein the third means is normally coupled to the first and second electrochemical cells while the first means is coupled to the first electrochemical cell.

4. A method of providing a nondestructive readout for a first electrochemical cell storage unit wherein the first cell includes at least a pair of electrodes and an active material for transfer between the electrodes in representation of information and a second electrochemical cell storage unit in series with first cell and with the second cell including at least a pair of electrodes and an active material for transfer between the electrodes including the steps of,
providing a first current flow through the first cell in a first direction to transfer active material in the first cell.
providing a second current flow, through the first and second cells in a second direction opposite to the first direction to retransfer the active material within the first call and to transfer active material within the second cell to read out the first cell, and
providing a low-voltage source normally across the first and second cells to produce a third current flow through the first and second cells and with the third current flow in the same direction through the first cell as the first current flow and with the third current flow retransferring the active material in the second cell and transferring the active material in the first cell.

5. The method of claim 4 additionally including the step of monitoring the second current flow to provide an output indication of the quantity of active material which was transferred due to the first current flow.

6. A method of providing a nondestructive readout for a first electrochemical cell and with the first electrochemical cell connected in a circuit including the first electrochemical cell and a second electrochemical cell in series and with a first set of terminals coupled to the first cell and with a second set of terminals coupled to the series arrangement of the first and second cells and with a low-voltage source coupled across the second set of terminals to provide a current flow through the first and second cells in a first direction, including the steps of,
providing a first current to the first set of terminals to provide a first current through the first cell in the first direction to record information in the first cell,
providing a second current to the second set of terminals to provide a second current through the first and second cells in a second direction opposite to the first direction to read out the information in the first cell and with the current provided by the low-voltage source automatically restoring the information in the first cell when the second current is discontinued.

7. The method of claim 6 additionally including the step of monitoring the second current to provide an output indication of the information recorded in the first cell.

8. Apparatus for providing a nondestructive readout of an electrochemical storage cell, including
first and second electrochemical cells in series,
first means for providing a first current in a first direction representative of information through the first cell,
second means for providing a second readout current in a second opposite direction through the first and second cells,
third means including a source of voltage having a value less than 0.5 volts for providing a third restoring current in the first direction through the first and second cells, and
switching means coupled to the second and third means for additionally coupling the second and third currents through the first and second cells.

9. The apparatus of claim 8 additionally including means for monitoring the second readout current to provide an output indication of the information in the first cell.